Oct. 6, 1964     L. J. BORNSTEIN     3,151,447
IGNITER DEVICE

Filed Aug. 12, 1960     2 Sheets-Sheet 2

INVENTOR.
LAWRENCE J. BORNSTEIN
BY
D. Gordon Angus
ATTORNEY

United States Patent Office 3,151,447
Patented Oct. 6, 1964

3,151,447
IGNITER DEVICE
Lawrence J. Bornstein, Sacramento, Calif., assignor to Aerojet-General Corporation, Azusa, Calif., a corporation of Ohio
Filed Aug. 12, 1960, Ser. No. 49,383
6 Claims. (Cl. 60—35.6)

This invention relates to rocket motors and more particularly to means for igniting the propellant within the rocket motor.

In accordance with the present invention, the principal object is to provide a rocket motor igniter that may be armed after the complete assembly of the rocket motor and missile.

Jet propelled devices such as rocket motors ordinarily comprise a combustion chamber, a charge of fuel within the chamber, and an exhaust nozzle through which the gases, resulting from combustion of the fuel charge, pass at high velocity to create propulsive thrust. It is common to install an igniter within the charge during the assembly of the rocket motor. However, it is entirely possible to detonate the igniter accidentally.

According to my invention, it is possible to fully assemble a rocket motor with a warhead and electronic guidance instrumentation into an integral missile unit without any possibility of accidental ignition of the rocket motor. The invention is carried out by installing a container of pyrotechnic material within the rocket motor during assembly. The last step prior to launching is to install an electric squib which is connected to the combustion chamber exterior and communicates with chamber interior, being accessible from the rocket motor exterior.

Briefly, the present invention comprises the combination of a porous igniter basket containing a pyrotechnic material fastened to the rocket motor housing and extending into the interior of the solid propellant, and an electric squib is inclined at an angle to the igniter and attached to the rocket motor housing. An access port through the rocket motor allows the insertion or removal of the electric squib from the assembled rocket motor and missile.

Figure 1:
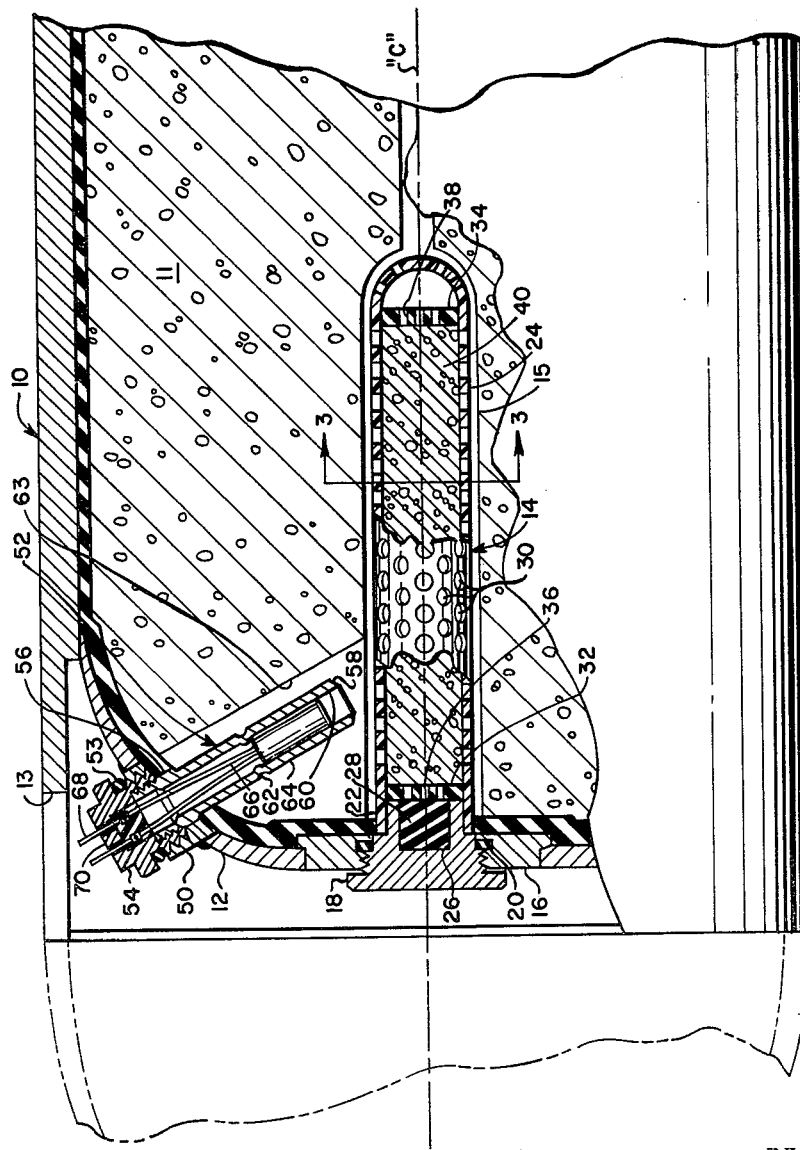
Figure 2:
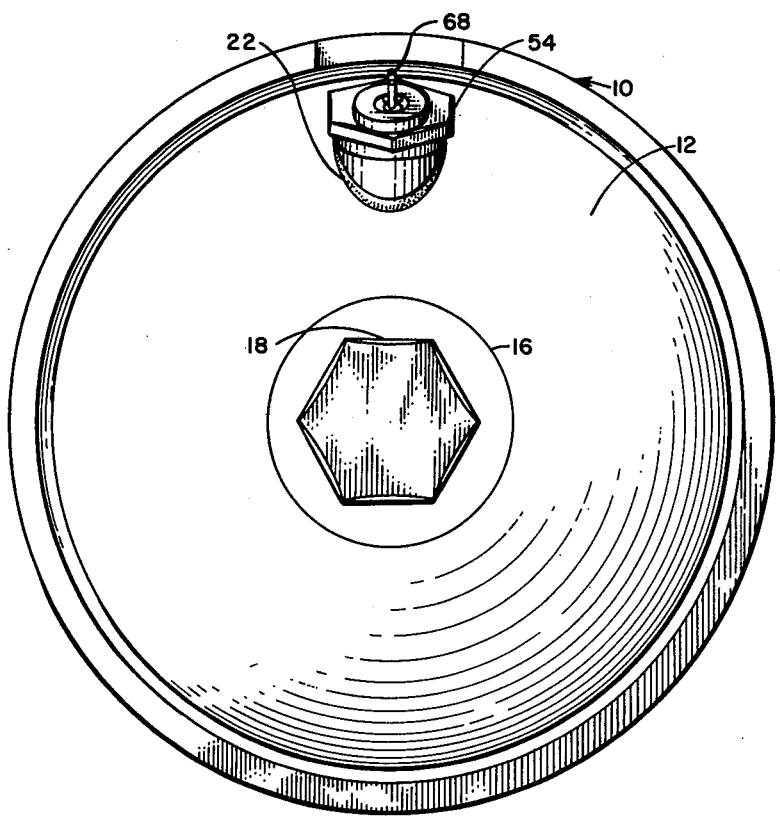
Figure 3:
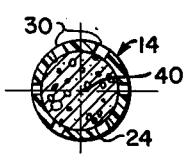
Figure 5:
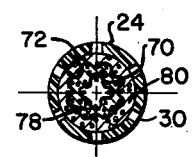
Figure 4:
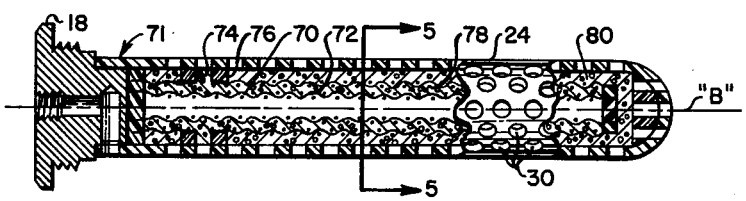

The foregoing and other features of my invention will be better understood from the following detailed description taken in conjunction with the accompanying drawings of which:

FIGURE 1 is a partial longitudinal cross section showing the igniter and squib according to the present invention, FIGURE 2 is an end view of the present invention shown with the warhead removed, FIGURE 3 is a cross section of the igniter taken along line 3—3 in FIGURE 1, FIGURE 4 is a cross sectional view of another embodiment of the igniter of the present invention; and FIGURE 5 is a cross section of the igniter taken along line 5—5 in FIGURE 4.

Referring to FIGURES 1 and 2, the rocket motor 10 is substantially cylindrical in configuration and includes a housing 13 with a solid fuel grain propellant 11 mounted inside in a manner well known in the art. The housing has a bell-shaped end cap 12 fixedly attached to one of the open ends. Centrally located in the end cap is an igniter element 14. An adapter 16 is attached to the end cap as for example, by welding, and provides an attaching device for the igniter element 14. The igniter element comprises a plug 18 that is threadedly received by the adapter 16 and is in sealing engagement therewith by interposing the gasket 20 between the adapter 16 and the plug threads. The configuration of the plug 18 may be as shown with a hexagonally-shaped head to facilitate installation and removal of the igniter element 14 within the end cap 12. Numerous configurations of the plug 18 may be used to accommodate assembly by any means.

A snout 22 extends from the head of the plug 18 sufficiently within the rocket motor interior to allow the perforate igniter basket 24 to be supported thereby. A cavity 26 in the plug snout 22 receives a heat insulator 28 such as zinc stearate or the like. The igniter 14 nests within the cavity 15 of the solid propellant 11.

The igniter basket 24 extends longitudinally within the correspondingly shaped recess 25 in fuel grain 11 of the rocket motor interior. The embodiment illustrated in FIGURE 1 is an example of the possible shape of the igniter basket. The igniter basket 24 is formed as an elongated cylindrical member having its side wall and end wall formed integrally. A plurality of orifices 30 extends through the side and end walls of the basket and are used to allow hot gases to be distributed uniformly in all directions from the igniter when in operation. Glass fibers or rovings impregnated by a suitable plastic material such as epoxy or polyester resins are suitable materials to fabricate the basket 24. Other suitable materials such as perforated metal or wire mesh can be used to form the basket 24. The only requirement of the basket 24 is to retain the combustible charge until completely consumed and should not become broken or disintegrated in operation. A suitable plastic glass fiber igniter basket is the subject of a patent application bearing Serial No. 708,583, filed January 13, 1958 by Herman Schneiderman et al., now Patent No. 3,021,241 and assigned to the same assignee as the subject patent application.

The partitions 32, 34 are cylindrically shaped and have a plurality of passageways 36, 38 therethrough. The basket 24 has the partitions 32, 34 placed at its open and closed ends to confine the pyrotechnic material 40 contained therein.

A plastic tape (not shown) may be wrapped around the basket 24 to prevent the pyrotechnic material 40 from falling out of the orifices. A waterproof covering (not shown) may shield the plastic tape from weather deterioration.

The igniter basket 24 may be filled with any suitable pyrotechnic material 40. For example, a suitable mixture is 13 parts by weight of black powder and 100 parts by weight of a pyrotechnic composition disclosed in the copending patent application bearing Serial No. 309,039, filed September 11, 1952, by Calvin A. Gongwer now Patent No. 3,019,687 and assigned to the same assignee as the present invention.

The tube 50 is fixedly attached to the end cap 12 and may be positioned radially, as shown in FIGURE 2, and at an oblique angle to the longitudinal axis "C" of the rocket motor 10 as shown in FIGURE 1. An electric squib or hot gas generator or initiator 52 is received by the tube 50 and extends within the rocket motor 10 inside recess 51 in fuel grain 11 and is directed toward the igniter 14. For reasons to become apparent below, recesses 25 and 51 communicate with each other. The angle between the electric squib 52 and the igniter 14 is variable, depending upon the distance between these two components, the size of the basket orifices, and the type of ignitible material being used. In the present embodiment a 60° angle exists between electric squib 52 and the igniter 14.

The electric squib or initiator 52 has a plug 54 that is threadedly received by the tube 50. A shell 56 is threaded at one end into the plug 54 and has an elongated necked-down snout 58 that extends from the plug 54 through the tube and into the rocket motor. The O ring seal 53 is positioned between the plug 54 and the tube 50 to prevent gas leaks from the interior of the rocket motor 10. A passageway 60 extends throughout the shell 56. The squib 52 consists of a paper, metallic, or plastic encased pyrotechnic material 64 having a high resistance electrical wire 66 contained therein for ignition purposes. A cavity 13 is provided in the propellant grain 11 to admit the electric squib into the rocket motor interior.

Although the squib 52 is shown in FIGURE 1 at an angle to the igniter element 14, it is within the present invention to place the squib 52 in any angle or in juxtaposition relative to the igniter element 14.

The paper, metallic, or plastic encased pyrotechnic material 64 is cemented to the interior of the shell 56 as for instance, by an epoxy resin adhesive, and is partially positioned at one end by a recess 62. The opposite end of the paper, metallic, or plastic encased pyrotechnic material 64 is directed toward the open end of the shell 56. The wires 66 extend upwardly toward the plug 54 and are attached to the leads 68. A potting material 70 supports the leads 68 and wires 66 to keep them from "shorting out" against the plug 54. A port 13 in the rocket motor 10 affords access to the squib 52 after the entire rocket is assembled into a missile or a completed unit.

To operate the igniter element 14 and initiator or squib 52 assembly, the leads 68 are connected to a suitable electric source (not shown) positioned exteriorly of the rocket 10. Application of an electrical current to the wires 66 instantaneously ignites the pyrotechnic material 64 within the squib 52 and the resulting flames shoot outwardly through the passageway 60 of the shell 56. The issued flames impinge upon the igniter 14 entering the orifices 30 in the basket 24 and ignite the pyrotechnic material 40 contained therein. Complete ignition of the pyrotechnic material 40 causes sparks (point sources of heat) to be projected from the basket orifices 30 thereby igniting the rocket motor propellant grain in the immediate proximity of the igniter.

Referring to FIGURES 4 and 5, another embodiment of the igniter is shown. Substantially the same basket 24 and plug 18 are used as shown in the igniter 14 in FIGURE 1. An inner screen 70 of an elongated cylindrical configuration extends concentrically to the axis B of the igniter 71. This inner screen 70 provides a cavity or channel through which the entire length of the pyrotechnic material may be ignited. Surrounding the screen 70 is a second screen 72 of a similar configuration but of a larger diameter. The second screen 72 is supported in position at the plug end of the igniter 71 by a pair of annulus-shaped separators 74, 76. A first pyrotechnic material 78 such as a black powder or the like, nests between the screens 70, 72 and at the area between the separators 74, 76, extends to abut the interior of the igniter basket 24. A second pyrotechnic material 80 having a slower burning rate than the first pyrotechnic material 78 is packed between the second screen 72 and the igniter basket 24. The second pyrotechnic material may be, for example, a mixture of 13 parts by weight of black powder and 100 parts by weight of the solid propellant described in the patent application bearing the Serial No. 708,583, filed January 13, 1958, by Herman Schneiderman, et al., now Patent No. 3,021,241, and assigned to the same assignee as the present invention.

The operation of the embodiment, shown in FIGURES 4 and 5, is quite similar to the operation of the assembly shown in FIGURE 1. The squib 52 is positioned with the passageway 60 of the shell 56 directed at the area between the partitions 74, 76 of the igniter basket 24. The flames issued from the squib 52 easily ignite the first pyrotechnic material 78 contained therein. The first pyrotechnic material 78 burns along its entire length adjacent to the screen 70. Thereafter, subsequent ignition of the second pyrotechnic material 80 causes hot gases to issue through the orifices 30 and impinge upon the solid propellant contained within the rocket motor.

It should be understood that the description and drawings employed in the above specification are given by way of example rather than of limitation; and the invention is not limited except by the scope of the appended claims.

I claim:
1. An igniter element comprising: a hollow elongated basket closed at one end and having a plurality of orifices therethrough, a cap member fixedly attached and closing the open end of said basket, a first hollow elongated container concentrically positioned within the basket, a second hollow elongated container received by said basket and surrounding said first container, a first rapidly burning easily ignited pyrotechnic material received between said first container and said second container, and a second slow burning pyrotechnic material received between said basket and said second container.

2. An igniter element as defined in claim 1 in which the first pyrotechnic material extends through said second pyrotechnic material to at least one of said orifices in said basket.

3. An igniter element as defined in claim 1 in which the first pyrotechnic material extends through said second pyrotechnic material to at least one of said orifices in said basket, and means for insulating that portion of said first pyrotechnic material extending through said second pyrotechnic material from said second pyrotechnic material.

4. An apparatus of the class described comprising a rocket motor, said rocket motor mounted in a housing, said rocket motor housing having a first opening formed therein, a perforate basket removably mounted in the first opening, a pyrotechnic material in said basket, a second opening in said rocket motor housing, communicating with the perforate walls of said basket, a hot gas generating means removably mounted in said second opening of said rocket motor housing and directed against the perforate walls of said basket, whereby when the hot gas generating means is actuated, the hot gas penetrates the walls of the basket and ignites the pyrotechnic material in the perforate basket to start the rocket motor.

5. In an apparatus as defined in claim 4, said pyrotechnic material being formed in a plurality of distinct concentric layers, the inner one of said layers being composed of rapid burning, easily ignitable pyrotechnic material and the outer one of said layers being composed of slow burning pyrotechnic material.

6. In a rocket motor, a solid fuel grain, said solid fuel grain having a first recess formed therein, a perforate basket removably mounted in said first recess in said solid fuel grain, a pyrotechnic material in said perforate basket, a removable closure for said basket to seal the basket and pyrotechnic material in the fuel grain, said solid fuel grain having a second recess communicating with said first recess, a hot gas generating means removably mounted in said second recess in said solid fuel grain, said hot gas generating means in said second recess of said solid fuel grain directed so when it is actuated, the hot gas impinges on and penetrates the perforate walls of the basket to ignite the pyrotechnic material in the perforate basket causing it to ignite the solid fuel grain and start the motor.

References Cited in the file of this patent
UNITED STATES PATENTS

| | | |
|---|---|---|
| 1,530,692 | Paulus | Mar. 24, 1925 |
| 2,434,652 | Hickman | Jan. 20, 1948 |
| 2,516,898 | Meister | Aug. 1, 1950 |
| 2,743,580 | Loeb | May 1, 1956 |
| 2,934,014 | Smith et al. | Apr. 26, 1960 |
| 2,973,713 | Burton | Mar. 7, 1961 |
| 3,011,441 | Gordon | Dec. 5, 1961 |
| 3,014,425 | Turnvull et al. | Dec. 26, 1961 |

FOREIGN PATENTS

| | | |
|---|---|---|
| 958,434 | France | Sept. 12, 1949 |
| 15,111 | Great Britain | Nov. 20, 1886 |
| 26,909 | Great Britain | Dec. 5, 1907 |